United States Patent
Kutsuna et al.

(10) Patent No.: US 7,018,715 B2
(45) Date of Patent: *Mar. 28, 2006

(54) ORGANIC COATED STEEL HAVING EXCELLENT RUST PREVENTIVE AND CORROSION PREVENTIVE PERFORMANCES AND RUST PREVENTING METHOD FOR METAL

(75) Inventors: Takaaki Kutsuna, Kanagawa (JP); Shuta Kihara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/406,498

(22) Filed: Apr. 4, 2003

(65) Prior Publication Data

US 2003/0190478 A1    Oct. 9, 2003

(30) Foreign Application Priority Data

Apr. 4, 2002  (JP) ............................. 2002-102183
May 16, 2002  (JP) ............................. 2002-141434

(51) Int. Cl.
  *B32B 27/28*  (2006.01)
  *B32B 15/08*  (2006.01)
  *B32B 31/00*  (2006.01)
  *B32B 33/00*  (2006.01)

(52) U.S. Cl. ...................... 428/416; 428/413; 428/414; 428/418

(58) Field of Classification Search ................ 428/413, 428/414, 416, 418
See application file for complete search history.

(56) References Cited

U.S. PATENT DOCUMENTS 5,312,491 A * 5/1994 Binter ......................... 148/240
5,387,368 A * 2/1995 Nishimura et al. .... 252/188.28
5,464,924 A   11/1995 Silvis et al.
6,861,147 B1 * 3/2005 Kutsuna et al. ............. 428/416

FOREIGN PATENT DOCUMENTS

| EP | 0 327 039 | 8/1989 |
|---|---|---|
| EP | 1 072 631 | 1/2001 |
| EP | 1 270 206 | 1/2003 |
| JP | 10-028928 | 2/1998 |
| JP | 2001-152085 | 6/2001 |
| WO | WO 96/16689 | 6/1996 |
| WO | WO 96/18669 | 6/1996 |

OTHER PUBLICATIONS

U.S. Appl. No. 10/408,130: copending applicationd filed Apr. 8, 2003.*
Communication dated Sep. 13, 2004, for Application No. EP 03 007 564.2.
European Search Report dated Aug. 1, 2003 for EP 03 00 7564.

* cited by examiner

*Primary Examiner*—Michael J. Feely
(74) *Attorney, Agent, or Firm*—Antonelli, Terry, Stout and Kraus, LLP.

(57) ABSTRACT

Provided are an organic coated steel having an epoxy resin layer coated on the surface of the steel product, which is formed by curing an epoxy resin composition comprising an epoxy resin and an epoxy resin curing agent as principal components and which has an oxygen permeability coefficient of 2 ml·mm/m$^2$·day·MPa or less at a temperature of 23° C. and a relative humidity of 60% RH, an organic coated steel having the above epoxy resin layer and a polymer resin layer laminated in order on the surface of a steel product and a rust preventing method for metal in which a coating layer of the above epoxy resin layer is formed on the surface of metal. The above epoxy resin layer has a high gas barrier property and a good adhesive property even under wide temperature and humidity environment, and therefore the organic coated steel and the rust preventing method for metal according to the present invention make it possible to provide a steel product having a high rust preventive and corrosion preventive effect even under severe environment and extend the life of the steel product.

24 Claims, No Drawings

ORGANIC COATED STEEL HAVING EXCELLENT RUST PREVENTIVE AND CORROSION PREVENTIVE PERFORMANCES AND RUST PREVENTING METHOD FOR METAL

BACKGROUND OF THE INVENTION

1. Field of the Invention

The present invention relates to an organic coated steel which is excellent in rust preventive and corrosion preventive performances and a rust preventing method for metal, specifically to an organic coated steel which has a strong adhesive force between a polymer resin and the steel product and which is excellent in rust preventive and corrosion preventive performances and a rust preventing method in which a rust preventing and corrosion preventing effect can be maintained even under severe environment.

2. Description of the Related Arts

A steel product coated on a surface thereof with a polymer resin is excellent in decorativeness and functionality as compared with a painted steel product and can be expected from the viewpoint of environmental protection, and therefore it is used for building materials for houses, electric appliances and can materials.

In particular, a steel product coated on a surface thereof with a polyolefin resin (hereinafter referred to as a polyolefin-coated steel product) is excellent in a corrosion preventive performance over a long period of time, so that it is used for steel products for building materials used in the sea bottom, an extremely cold area and a tropical area and steel pipes for pipelines which transport crude oil, heavy oil and natural gas in addition to the uses of steel pipes, steel pipe piles, steel plates and the like. However, a transported fluid temperature in a pipeline is elevated because of deepening of oil wells and turning into heavier oil, and a steel product is required to be improved in a corrosion preventive performance under a wide temperature environment. In addition thereto, cathode peeling caused by excess protective current is a problem under environment in which electric protection is used in combination, and therefore an improvement in a cathode peeling resistance at high temperature is a subject. Further, in respect to electric protection, a steel product is required to be further improved in rust preventive and corrosion preventive performances in order to reduce an amount of electricity used for corrosion prevention.

There is conventional methods regarding a polyolefin-coated steel product for elevating a corrosion preventive performance of a steel product by providing chromate treatment between the steel product and a modified polyolefin adhesive layer or by allowing an epoxy resin to intervene therebetween. In these methods, the satisfactory performance is obtained in water at 60° C. or lower, but the satisfactory performance is not obtained in a cathode peeling resistance in water exceeding 60° C. Further, the adhesive property between a polyolefin resin layer and a steel product after hot water treatment is notably reduced, and therefore it is difficult to maintain the corrosion preventive performance over a long period of time.

Japanese Patent Application Laid-Open No. 170433/1999 proposed a technique for solving the problem described above that is making a steel product which surface is composed of a chromate layer, an epoxy resin layer formed by blending a specific epoxy resin, specific amines and a specific phenol resin as an organic filler, a modified polyolefin adhesive layer and a polyolefin resin layer to thereby provide a polyolefin-coated steel product. The product maintains well an adhesive property between the polyolefin resin layer under wide temperature environment and which is excellent in a warm water resistance and a cathode peeling resistance. However, the rust preventive and corrosion preventive performances are required to be further elevated in order to reduce an amount of electricity used in electric protection which is used in combination when used over a long period of time under humid and hot environment as is the case with, for example, steel pipes for a pipeline. Also, in uses of building materials for houses, electric appliances and can materials in which electric protection is not used in combination, a steel product is required to be further improved in rust preventive and corrosion preventive performances for the purpose of extending the use life of a steel product itself.

Also, steel plates and steel products obtained by subjecting the surface of a zinc base plated steel plate or an aluminum base plated steel plate to chromate processing with a processing solution comprising chromic acid, bichromic acid or salts thereof as a principal component for the purpose of elevating the corrosion preventive (rust preventive) property are widely used for steel plates and steel products which are widely used for home electric products, automobiles and building materials. This method is an economical method which provides an excellent corrosion preventive property and which can relatively readily be carried out.

On the other hand, many processing techniques which do not depend on chromate processing are proposed in order to prevent rust from being generated on various steel plates. A method in which tannic acid is used is proposed in, for example, Japanese Patent Application Laid-Open No. 71233/1976, and a method in which a mixed composition of an aqueous resin and polyhydric phenol carboxylic acid is used is proposed in Japanese Patent Application Laid-Open No. 325760/1996. In these methods, however, the barrier property to a corrosive factor such as oxygen and water is not satisfactory, and the corrosion preventive property over a long period of time is not satisfactory. A method in which a reaction product of a coat-forming organic resin such as an epoxy resin with a hydrazine derivative is used for a coat is proposed in Japanese Patent Application Laid-Open No. 119879/2000 as a method for solving these problems. In this method, an epoxy resin surely shows a relatively high oxygen barrier property as compared with those of the other thermosetting resins such as a urethane resin and an acryl resin, but the level thereof is not satisfactory, and required is a rust preventive and corrosion preventive method for steel plates and steel products in which further excellent corrosion preventive property is exhibited.

SUMMARY OF THE INVENTION

In light of the situation described above, a first object of the present invention is to provide an organic coated steel having excellent rust preventive and corrosion preventive performances, and a second object of the present invention is to provide a corrosion preventing method for metal such as a steel plate and a steel product in which an excellent corrosion preventive property is revealed.

Intensive investigations carried out by the present inventors in order to achieve the objects described above have resulted in finding that oxygen is cut off from permeating toward a steel product by laminating as a coat or a primer layer, a high oxygen barriering layer comprising a specific epoxy resin and a specific epoxy resin curing agent as principal components on the surface of the steel product, whereby obtained is an organic coated steel which is markedly excellent in rust preventive and corrosion preventive performances under wide temperature and humidity environment. Thus, they have come to complete the present invention.

That is, the first embodiment of the present invention provides an organic coated steel having an epoxy resin layer coated on the surface of a steel product or an epoxy resin layer and a polymer resin layer laminated in order on the surface of the steel product, wherein the above epoxy resin layer is formed by curing an epoxy resin composition comprising an epoxy resin and an epoxy resin curing agent as principal components and the above epoxy resin layer has an oxygen permeability coefficient of 2 ml·mm/m²·day·MPa or less at a temperature of 23° C. and a relative humidity of 60% RH.

Further, the second embodiment of the present invention provides a rust preventing method for metal in which a coating layer is formed on a surface of metal, wherein the above coating layer is formed by curing an epoxy resin composition comprising an epoxy resin and an epoxy resin curing agent as principal components and the above epoxy resin layer has an oxygen permeability coefficient of 2 ml·mm/m²·day·MPa or less at a temperature of 23° C. and a relative humidity of 60% RH.

DETAILED DESCRIPTION OF THE PREFERRED EMBODIMENTS

In the present invention, a steel product means those obtained by processing carbon steel, low alloy steel and the like into shape steel, steel plates, steel pipe piles, steel pipes for transporting crude oil, heavy oil and natural gas and metal cans, and it is used indoors, outdoors and in the ground and the sea. A steel product can be subjected, if necessary, to surface treatment by publicly known methods (for example, physical means such as shot blast treatment, grit blast treatment and sand blast treatment, chemical means such as acid cleaning and alkali degreasing and combinations thereof) before using. Further, it can be subjected as well, if necessary, to chemical conversion treatment such as chromate treatment and zinc phosphate treatment as backing treatment. The organic coated steel of the present invention has high rust preventive and corrosion preventive performances even if it is not subjected to these treatments, but subjecting it to these treatments makes it possible to further raise the rust preventive and corrosion preventive performances.

First, the epoxy resin layer which is formed as a coat or a primer layer on the organic coated steel in the present invention shall be explained below. The epoxy resin layer in the present invention is formed from an epoxy resin composition comprising an epoxy resin and an epoxy resin curing agent as principal components, and the above epoxy resin composition is characterized by having an oxygen permeability coefficient of 2 ml·mm/m²·day·MPa or less, preferably 1 ml·mm/m²·day·MPa or less at a temperature of 23° C. and a relative humidity of 60% RH. In this case, the oxygen permeability coefficient is a value showing an amount of oxygen which permeates one square meter of the sample having a thickness of 1 mm in 24 hours under an oxygen partial pressure difference of 1 atm.

Further, 30% by weight or more of a skeletal structure represented by the following Formula (1) is preferably contained in an epoxy resin-cured product formed from the epoxy resin composition described above. The above skeletal structure controlled to 30% by weight or more reveals the good gas barrier property and exhibits the excellent rust preventive and corrosion preventive performances.

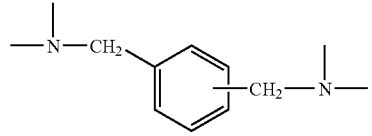

Next, the epoxy resin and the epoxy resin curing agent shall be explained in details.

(Epoxy Resin:)

The epoxy resin in the present invention may be any of a saturated or unsaturated aliphatic compound and alicyclic compound, an aromatic compound and a heterocyclic compound, and considering the high rust preventive and corrosion preventive performances brought about by revelation of the high gas barrier property, the epoxy resin having an aromatic ring in a molecule is preferred.

The typical example of the epoxy resins are epoxy resins having a glycidylamine part which are derived from metaxylylenediamine, epoxy resins having a glycidylamine part which are derived from 1,3-bis(aminomethyl)cyclohexane, epoxy resins having a glycidylamine part which are derived from diaminodiphenylmethane, epoxy resins having a glycidylamine part and/or a glycidyl ether part which are derived from paraaminophenol, epoxy resins having a glycidyl ether part which are derived from bisphenol A, epoxy resins having a glycidyl ether part which are derived from bisphenol F, epoxy resins having a glycidyl ether part which are derived from phenol novolak and epoxy resins having a glycidyl ether part which are derived from resorcinol. Among them, preferred are the epoxy resins having a glycidylamine part which are derived from metaxylylenediamine, the epoxy resins having a glycidylamine part which are derived from 1,3-bis(aminomethyl)cyclohexane, the epoxy resins having a glycidyl ether part which are derived from bisphenol F and epoxy resins having a glycidyl ether part which are derived from resorcinol.

Further, the epoxy resins having a glycidyl ether part which are derived from bisphenol F and the epoxy resins having a glycidylamine part which are derived from metaxylylenediamine are more preferably used as the principal component, and the epoxy resin having a glycidylamine part which is derived from metaxylylene-diamine is particularly preferably used as the principal component.

Further, the various epoxy resins described above can be used in a mixture in a suitable proportion in order to elevate various performances such as a flexibility, an impact resistance and a humidity and heat resistance.

The epoxy resin in the present invention is obtained by reacting various alcohols, phenols and amines with epihalohydrin. For example, the epoxy resins having a glycidylamine part which are derived from metaxylylene-diamine are obtained by adding epichlorohydrin to metaxylylenediamine.

In this case, the glycidylamine part described above includes mono-, di-, tri- and/or tetraglycidylamine parts which can be substituting with four hydrogens in diamine contained in xylylenediamine. The respective proportions of the mono-, di-, tri- and/or tetraglycidylamine parts can be changed by changing the reaction proportion of metaxylylenediamine to epichlorohydrin. For example, an epoxy resin having mainly a tetraglycidylamine part is obtained by addition-reacting metaxylylenediamine with about four time moles of epichlorohydrin.

The epoxy resin in the present invention is synthesized by reacting various alcohols, phenols and amines with excess epihalohydrin on the temperature condition of 20 to 140° C., preferably 50 to 120° C. in the case of alcohols and phenols and 20 to 70° C. in the case of amines under the presence of alkali such as sodium hydroxide and by separating resulting alkali halide.

A number average molecular weight of the resulting epoxy resin is varied according to a mole ratio of epihalohydrin to various alcohols, phenols and amines, and it is about 80 to 4000, preferably about 200 to 1000 and more preferably about 200 to 500.

(Epoxy Resin Curing Agent:)

Epoxy resin curing agents such as polyamines, phenols, acid anhydrides and carboxylic acids which can usually be used can be used for the epoxy resin curing agent in the present invention. These epoxy resin curing agents may be any of saturated or unsaturated aliphatic compounds and alicyclic compounds, aromatic compounds and heterocyclic compounds and can be selected according to the uses of the organic coated steel and the performances required in the uses.

To be specific, typical examples of the polyamines are aliphatic amines such as ethylenediamine, diethylenetriamine, triethylenetetraamine and tetraethylenepentaamine, aliphatic amines having aromatic rings such as metaxylylenediamine and paraxylylenediamine, alicyclic amines such as 1,3-bis(aminomethyl)cyclohexane, isophoroneamine and norbornanediamine, aromatic amines such as diaminodiphenylmethane and metaphenylenediamine and reaction products thereof with epoxy resins or monoglycidyl compounds using them as a raw material, reaction products thereof with alkylene oxide having 2 to 4 carbon atoms, reaction products thereof with epichlorohydrin and reaction products thereof with multifunctional compounds having at least one acyl group which can form an amide group part by reacting with these polyamines to form oligomers, and reaction products of monovalent carboxylic acids having 1 to 8 carbon atoms and/or derivatives thereof with multifunctional compounds having at least one acyl group which can form an amide group part by reacting with these polyamines to form oligomers.

The phenols include multisubstituent monomers such as catechol, resorcinol and hydroquinone and resol type phenol resins.

Typical examples of the acid anhydrides are aliphatic acid anhydrides such as dodecenylsuccinic anhydride and polyadipinic anhydride, alicyclic acid anhydrides such as (methyl) tetrahydro-phthalic anhydride and (methyl)hexahydro-phthalic anhydride, aromatic acid anhydrides such as phthalic anhydride, trimellitic anhydride and pyromellitic anhydride, and carboxylic acids corresponding to them.

Considering the high barrier property and the good adhesive property, the following reaction product of (A) and (B) or the following reaction product of (A), (B) and (C) is preferably used as the epoxy resin curing agent:
(A) metaxylylenediamine or paraxylylenediamine (polyamine),
(B) a multifunctional compound having at least one acyl group which can form an amide group part by reacting with polyamine to form an oligomer.
(C) monovalent carboxylic acid having 1 to 8 carbon atoms and/or a derivative thereof.

The multifunctional compound of (B) having at least one acyl group which can form an amide group part by reacting with polyamine to form an oligomer includes carboxylic acids such as acrylic acid, methacrylic acid, maleic acid, fumaric acid, succinic acid, malic acid, tartaric acid, adipic acid, isophthalic acid, terephthalic acid, pyromellitic acid and trimellitic acid and derivatives thereof, for example, esters, amides, acid anhydrides and acid chlorides. In particular, acrylic acid, methacrylic acid and derivatives thereof are preferred.

The monovalent carboxylic acid of (C) having 1 to 8 carbon atoms includes formic acid, acetic acid, propionic acid, butyric acid, lactic acid, glicolic acid and benzoic acid. Further, the derivatives thereof, for example, esters, amides, acid anhydrides and acid chlorides can be used as well. They may be used in combination with the multifunctional compounds described above and reacted with polyamine (metaxylylenediamine or paraxylylenediamine).

In respect to a reaction ratio in the reaction of metaxylylenediamine or paraxylylenediamine of (A) with the multifunctional compound of (B) having at least one acyl group which can form an amide group part by reacting with polyamine to form an oligomer, a mole ratio of the multifunctional compound to the polyamine component falls preferably in a range of 0.3 to 0.95.

The amide group part introduced by the reaction has a high cohesive force, and the presence of the amide group part in the epoxy resin curing agent in a high proportion reveals a higher oxygen barrier property and notably raises the rust preventive and corrosion preventive performances of the epoxy resin. Also, the good adhesive strength to the steel product can be obtained. Further, the various epoxy resin curing resin agents described above can be mixed in a suitable proportion and used in order to elevate various performances such as a flexibility, an impact resistance and a humidity and heat resistance.

(Epoxy Resin Layer:)

A blend proportion of the epoxy resin curing agent to the epoxy resin which is the principal component in the epoxy resin layer in the present invention may fall in a standard blend range used when usually producing an epoxy resin cured product by reacting an epoxy resin with an epoxy resin curing agent. To be specific, a ratio of the number of active hydrogen contained in the epoxy resin curing agent to the number of an epoxy group contained in the epoxy resin falls in a range of 0.5 to 5.0, preferably 0.8 to 2.0.

When forming the epoxy resin layer on the surface of the steel product, a wetting agent such as a silicon or acryl base compound may be added to the epoxy resin composition in order to aid wetting on the surface of the steel product. The suitable wetting agent includes BYK331, BYK333, BYK338 and BYK381 which are available from BYK Chemie GmbH. When adding them, a proportion thereof falls preferably in a range of 0.01 to 2.0% by weight based on the whole weight of the epoxy resin composition.

Also, an inorganic filler such as silica, alumina, mica, talc, aluminum flake and glass flake may be added to the epoxy resin composition in order to elevate various performances such as an oxygen barrier property, an impact resistance and a heat resistance of the epoxy resin layer in the present invention. Considering the high oxygen barrier property, such inorganic filler is preferably flat. When adding them, a proportion thereof falls preferably in a range of 0.01 to 10.0% by weight based on the whole weight of the epoxy resin composition.

Further, a coupling agent such as a silane coupling agent and a titanium coupling agent may be added to the epoxy resin composition in order to elevate an adhesive property of the epoxy resin layer of the present invention to the steel product. When adding them, a proportion thereof falls preferably in a range of 0.01 to 5.0% by weight based on the whole weight of the epoxy resin composition.

Further, the respective components such as an organic solvent, an organic pigment and an inorganic pigment may be added, if necessary, to the epoxy resin composition forming the epoxy resin layer described above in a required amount.

The epoxy resin layer of the present invention has practically a layer thickness of 1 to 150 μm, preferably 30 to 80 μm. If it exceeds 150 μm, it is difficult to control the film thickness thereof.

(Polymer Resin Layer:)

The epoxy resin layer described above has a high gas barrier property and a good adhesive property, and therefore the organic coated steel of the present invention may be coated only with the epoxy resin layer described above, but laminating a polymer resin layer described later not only provides further better rust preventive and corrosion preventive performances but also prepares the organic coated steel which is excellent as well in a water resistance and a decorativeness.

Typical examples of the polymer resin layer forming the organic coated steel in the present invention include conventionally known polymer resin layer such as polyolefin resin layer using low density polyethylene, intermediate density polyethylene, high density polyethylene, linear low density polyethylene, polypropylene, etc., layer obtained by laminating the polyolefin resin layer described above on modified polyolefin resin layer, polyamide resin layer using nylon 6 or nylon 66, polyester resin layer using polyethylene terephthalate or polybutylene terephthalate, polyacrylic resin layer using polyacrylic acid, polymethacrylic acid or acid esters thereof, a polystyrene resin layer, a polycarbonate resin layer and a polyvinyl chloride resin layer. The polymer resin layer has preferably a thickness of 1.0 to 5.0 mm, particularly 1.5 to 3.5 mm. Suitable ones of these polymer resins can be selected according to the uses of the organic coated steel and the required performances in the uses thereof.

For example, polyolefin resins, polyacrylic resins and polyvinyl chloride resins can be used in the case of uses of roof materials and wall materials in building materials for houses, and polyester resins and polyolefin resins can be used in the case of uses of can materials.

When used as a steel pipe for pipelines transporting crude oil, heavy oil and natural gas, capable of being used is a resin layer obtained by laminating a polyolefin resin layer of low density polyethylene, intermediate density polyethylene, high density polyethylene, linear low density polyethylene or polypropylene on a modified polyolefin resin layer.

Typical examples of the modified polyolefin resin layer are publicly known resins such as those obtained by modifying the polyolefin resins described above with unsaturated carboxylic acids such as maleic acid, acrylic acid and methacrylic acid or acid anhydrides thereof and those obtained by diluting the modified products thereof with polyolefin resins. The modified polyolefin adhesive layer has preferably a thickness of 0.1 to 2.0 mm, particularly 0.5 to 1.0 mm.

(Production Process for the Organic Coated Steel:)

Next, the production process in laminating the polymer resin layer and the epoxy resin layer in the organic coated steel of the present invention shall be explained. When coated only with the epoxy resin layer without laminating the polymer resin layer, the organic coated steel is obtained in the same manner as a rust preventing method described later.

Typical method for laminating the polymer resin layer and the epoxy resin layer in the organic coated steel is either method of an extruding method in which the epoxy resin layer is formed on the surface of the steel product and in which the molten polymer resin is then extruded thereon to form a coating layer, or a film method in which the epoxy resin composition is applied on the surface of the steel product and in which a polymer film is immediately stuck before the curing reaction of the epoxy resin composition is finished and in which the curing reaction of the epoxy resin composition is completed. That is, in the case of the extruding method, the epoxy resin composition is coated on the surface of the steel product from which rust is removed and which is subjected to surface treatment such as shot blast treatment, grit blast treatment, sand blast treatment and degreasing and backing treatment such as chromate treatment and zinc phosphate treatment by means of a primer coating apparatus according to the coating method. Then, it is, if necessary, heated in a heating apparatus and cured to form the polymer resin layer. A coating method for the epoxy resin composition can suitably be selected from publicly known methods such as spray coating, roll coating, ironing coating, brush coating and flow coating according to the form of the steel product. A method for heating the steel product by means of a heating apparatus can suitably be selected from publicly known methods such as high frequency induction heating, far infrared heating and gas heating. Then, an adhesive layer such as a modified polyolefin resin layer is coated, if necessary, on the surface of the steel product on which the epoxy resin layer is formed, and the polymer resin is further coated on the surface thereof, followed by cooling it by means of a cooling apparatus to obtain a polymer-coated steel product. The modified polyolefin resin and the polymer resin are coated by extruding from a round die or a T die. They may be coated by co-extruding in the form of two layers or can be coated by separately extruding in the form of a single layer respectively.

Also, in the case of the film method, the epoxy resin composition is coated on the surface of the steel product from which rust is removed and which is subjected to surface treatment such as shot blast treatment, grit blast treatment, sand blast treatment and degreasing and backing treatment such as chromate treatment and zinc phosphate treatment by means of a primer coating apparatus according to the coating method. A coating method for the epoxy resin composition can suitably be selected from publicly known methods such as spray coating, roll coating, ironing coating, brush coating and flow coating according to the form of the steel product. After coating the epoxy resin composition, a polymer resin film is immediately stuck thereon by means of a roll, and then the curing reaction of the epoxy resin composition is completed, if necessary, by heating, whereby the organic coated steel is obtained. A method for heating the steel product by means of a heating apparatus can suitably be selected from publicly known methods such as high frequency induction heating, far infrared heating and gas heating.

When coating the polymer film on the steel product by the film method, the surface of the polymer film is preferably subjected, if necessary, to various surface treatments such as flame treatment and corona discharge treatment in order to maintain the good adhesive property to the epoxy resin composition. Further, a printing layer can be provided, if necessary, on the polymer film. When providing the printing layer, printing facilities which so far have been used for printing onto a conventional polymer film such as a gravure printing machine, a flexo printing machine and an offset printing machine are applied as well. Also, inks for forming the printing layer are inks which are produced from pigments of an azo base and a phthalocyanine base, resins such as rosin, a polyamide resin and polyurethane and solvents such as methanol, ethyl acetate and methyl ethyl ketone and which have so far been used for printing onto a conventional polymer film are applied as well.

The organic coated steel of the present invention uses the epoxy resin composition having a high oxygen barrier property under wide temperature and humidity environment, and therefore oxygen is notably cut off from permeating to the steel product, so that the steel product is markedly excellent in rust preventive and corrosion preventive performances. Thus, it becomes possible to reduce an amount of electricity used for electric protection which is used in combination for a steel product applied under humid and hot environment over a long period of time as is the case with a steel pipe for a pipeline, and the economical effect is very large. Further, in uses such as a steel product for building materials, electric appliances and can materials, the use life of the steel product can be extended.

(Rust Preventing Method for Metal:)

Next, the rust preventing method of the present invention for metal shall be explained. In the rust preventing method of the present invention for metal, publicly known metals such as iron, steel, zinc, copper, tin and lead can be applied. Publicly known forms can be applied as the form of the metal. The steel product which is obtained by processing carbon steel, low alloy steel and the like into shape steel, steel plate, steel pipe pile, steel pipe for transporting crude oil, heavy oil and natural gas and metal can etc., and which is used indoors, outdoors and in the ground and the sea is preferable. Typical steel products are conventionally known steel products such as cold rolled steel, hot rolled steel, hot dip zinced steel, electrolytic zinc-coated steel, hot dip zinced alloyed steel, aluminum-coated steel, aluminum-zinc alloyed coated steel and stainless steel. The steel product can be subjected, if necessary, to surface treatment by publicly known methods (for example, physical means such as shot blast treatment, grit blast treatment and sand blast treatment, chemical means such as acid cleaning and alkali degreasing and combinations thereof) before using. Further, it can be subjected as well, if necessary, to chemical conversion treatment such as chromate treatment and zinc phosphate treatment as backing treatment. If these treatments are omitted, one process is omitted, which is economical. Then rust preventing method for metal which is harmless for environment and human body is provided in the present invention because excellent effect of rust preventing is obtained without these chemical conversion treatment in the present invention.

The same layer as the epoxy resin layer in the organic coated steel of the present invention described above is used for a coating layer in the rust preventing method of the present invention for metal.

Allowed, if necessary, to be added in a required amount to the epoxy resin composition forming the coating layer formed by the rust preventing method for metal are respective components including, for example, a curing accelerating catalyst such as N-ethylmorpholine, dibutyltin dilaurate, cobalt naphthenate and stannous chloride, an organic solvent such as benzyl alcohol, a rust preventive additive such as zinc phosphate, iron phosphate, calcium molybdate, vanadium oxide, silica dispersed in water and fumed silica, an organic pigment such as phthalocyanine base organic pigments and condensed polycyclic organic pigments and an inorganic pigment such as titanium oxide, zinc oxide, calcium carbonate, barium sulfate, alumina and carbon black.

The coating layer in the rust preventing method for metal has practically a layer thickness of 1 to 150 µm, preferably 30 to 80 µm. If it is less than 1 µm, the satisfactory corrosion preventive property is not revealed, and if it exceeds 150 µm, it is difficult to control the film thickness thereof.

When carrying out the rust preventing method of the present invention, it can suitably be selected from optional methods such as a coating method, a dipping method and a spraying method according to the form of the metal. A publicly known method such as roll coating, ironing coating, brush coating and flow coating can be used for the coating method. Controlling of the coating amount and uniformization of the appearance and the film thickness can be carried out by an air knife method and a roll squeezing method after these treatments. After coating the resin composition, the curing reaction of the coating layer may be completed, if necessary, by means of a heating apparatus. A method for heating the metal by means of the heating apparatus can suitably be selected from publicly known methods such as a dryer, high frequency induction heating, far infrared heating and gas heating. The heating treatment is preferably carried out at a reached material temperature of 50 to 300° C., preferably 80 to 250° C.

In the rust preventing method of the present invention, oxygen is notably cut off from permeating to metal by using the high oxygen barriering epoxy resin composition, so that it is a method having markedly excellent rust preventive and corrosion preventive performances to the metal. Accordingly, use of the rust preventing method of the present invention makes it possible to extend the use life of the steel product used for building materials, electrical appliances, can materials, automobiles and bridges.

EXAMPLES

The present invention shall be explained below with reference to examples, but the present invention shall by no means be restricted by these examples.

First, epoxy resin curing agents used in the following examples shall be described.

(Epoxy Resin Curing Agent A:)

A reaction vessel was charged with one mole of metaxylylenediamine. The temperature was elevated to 60° C. under nitrogen flow, and 0.50 mole of methyl acrylate was dropwise added in one hour. After finishing dropwise adding, the mixture was stirred at 120° C. for one hour, and the temperature was elevated up to 180° C. in 3 hours while distilling off resulting methanol. The mixture was cooled down to 50° C. to obtain an epoxy resin curing agent A.

(Epoxy Resin Curing Agent B:)

A reaction vessel was charged with one mole of metaxylylenediamine. The temperature was elevated to 60° C. under nitrogen flow, and 0.67 mole of methyl acrylate was dropwise added in one hour. After finishing dropwise adding, the mixture was stirred at 120° C. for one and the temperature was elevated up to 180° C. in 3 hours while distilling off resulting methanol. The mixture was cooled down to 50° C. to obtain an epoxy resin curing agent B.

A. Examples and Comparative Examples of the Organic Coated Steels

Shown below are a method for evaluating a rust preventive performance of the organic coated steel in the examples and a method for evaluating an adhesive property thereof. The evaluation results of a rust preventive performance and adhesive property are shown in Table 1 and Table 2.

<Method for Evaluating a Rust Preventive Performance>

A steel plate (40×150×6.0 mm) was subjected to grit treatment, and an epoxy resin layer was coated on the surface thereof by means of a bar coater so that a film thickness of about 90 µm was obtained, and it was cured at 120° C. for 30 minutes to prepare a test piece. The coated steel plate was sprayed with saline water at 35° C., then the appearance of a coated film on the coated steel was judged according to four degrees.

Ex: no change observed, G: 1 to 2 rust dots,

F: 3 to 4 rust dots, P: 5 or more rust dots

<Method for Evaluating an Adhesive Property>

A steel plate (40×150×6.0 mm) was subjected to grit treatment, and an epoxy resin layer was coated on the surface thereof by means of a bar coater so that a film thickness of about 50 µm was obtained, and it was cured at 120° C. for 30 minutes. Then, a modified polyolefin adhesive resin (Adomer, manufactured by Mitsui Chemical Co., Ltd.) was fused on the surface of the coated part at 150° C. so that a film thickness of about 50 µm was obtained, and high density polyethylene was fused thereon at 150° C. so that a thickness of 2 mm was obtained to prepare a test piece. The coated steel plate thus obtained was subjected to a 90 degree peeling test at a peeling speed of 10 mm/min to evaluate the adhesive property.

Example 1

Added were 50 parts by weight of an epoxy resin having a glycidylamine part which was derived from metaxylylene-diamine (TETRAD-X, manufactured by Mitsubishi Gas Chemical Co., Ltd.), 33 parts by weight of the epoxy resin curing agent A and 0.02 part by weight of an acrylic wetting agent (BYK348, manufactured by BYK Chemie GmbH.), and the mixture was stirred well. This composition was an epoxy resin composition, and the rust preventive performance and the adhesive property thereof were evaluated. The epoxy resin layer had an oxygen permeability coefficient of 0.25 ml-mm/$m^2$·day·MPa at a temperature of 23° C. and a relative humidity of 60%.

Example 2

A composition was prepared and evaluated by the same method as in Example 1, except that 45 parts by weight of the epoxy resin curing agent B was substituted for the epoxy resin curing agent A. The epoxy resin layer had an oxygen permeability coefficient of 0.20 ml-mm/$m^2$·day·MPa at a temperature of 23° C. and a relative humidity of 60%.

Example 3

A composition was prepared and evaluated by the same method as in Example 1, except that 35 parts by weight of a reaction product of metaxylylene-diamine and methyl methacrylate having a mole ratio of 2:1 of metaxylylenediamine to methyl methacrylate (Gaskamine 340, manufactured by Mitsubishi Gas Chemical Co., Ltd.) was substituted for the epoxy resin curing agent A. The epoxy resin layer had an oxygen permeability coefficient of 0.40 ml-mm/$m^2$·day·MPa at a temperature of 23° C. and a relative humidity of 60%.

Comparative Example 1

A composition was prepared and evaluated by the same method as in Example 1, except that 97 parts by weight of an epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine. The epoxy resin layer had an oxygen permeability coefficient of 4.2 ml-mm/$m^2$·day·MPa at a temperature of 23° C. and a relative humidity of 60%.

Comparative Example 2

A composition was prepared and evaluated by the same method as in Example 1, except that 97 parts by weight of the epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine and that 33 parts by weight of a reaction product of metaxylylenediamine and epichlorohydrin having a mole ratio of 2:1 of metaxylylenediamine to epichlorohydrin (Gaskamine 328, manufactured by Mitsubishi Gas Chemical Co., Ltd.) was substituted for the epoxy resin curing agent A. The epoxy resin layer had an oxygen permeability coefficient of 8.4 ml-mm/$m^2$·day·MPa at a temperature of 23° C. and a relative humidity of 60%.

Comparative Example 3

A composition was prepared and evaluated by the same method as in Example 1, except that 97 parts by weight of the epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine and that 50 parts by weight of modified heterocyclic amine (Epomate B002, manufactured by Japan Epoxy Resin Co., Ltd.) was substituted for the epoxy resin curing agent A. The epoxy resin layer had an oxygen permeability coefficient of 36 ml-mm/$m^2$·day·MPa at a temperature of 23° C. and a relative humidity of 60% RH.

Comparative Example 4

A composition was prepared and evaluated by the same method as in Example 1, except that 97 parts by weight of the epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine and that 25 parts by weight of the reaction product of metaxylylenediamine and methyl methacrylate having a mole ratio of 2:1 of metaxylylenediamine to methyl methacrylate (Gaskamine 340, manufactured by Mitsubishi Gas Chemical Co., Ltd.) and 11 parts by weight of polyoxyalkylene-amine (Jefarmine T-403, manufactured by Hanzman Co., Ltd.) were substituted for the epoxy resin curing agent A. The epoxy resin layer had an oxygen permeability coefficient of 36 ml-mm/m$^2$·day·MPa at a temperature of 23° C. and a relative humidity of 60% RH.

TABLE 1

(evaluation results of rust preventive performance)

|  | Initial appearance | After 2 weeks | After 4 weeks | After 6 weeks |
|---|---|---|---|---|
| Example 1 | Ex | Ex | Ex | Ex |
| Example 2 | Ex | Ex | Ex | Ex |
| Example 3 | Ex | Ex | Ex | Ex |
| Comparative Example 1 | Ex | Ex | G | P |
| Comparative Example 2 | Ex | Ex | F | P |
| Comparative Example 3 | Ex | Ex | F | P |
| Comparative Example 4 | Ex | Ex | F | P |

TABLE 2

(evaluation results of adhesive property)

|  | Peel strength (kg/cm) |
|---|---|
| Example 1 | 25 |
| Example 2 | 24 |
| Example 3 | 25 |
| Comparative Example 1 | 21 |
| Comparative Example 2 | 20 |
| Comparative Example 3 | 20 |
| Comparative Example 4 | 28 |

B. Examples and Comparative Examples in Rust Preventive Method for Metal

<Method for Evaluating a Rust Preventive Performance>

A non-coated part of the coated steel plate was coated with a rust preventing paint and sprayed thereon with saline water under the environment of 35° C. to evaluate the appearance of the coating film by visually judging according to four degrees. The results thereof are shown in Table 3.

Ex: no change observed, G: 1 to 2 rust dots,

F: 3 to 4 rust dots, P: 5 or more rust dots

Example 4

A cold rolled steel plate (40×150×6.0 mm) was subjected to grit treatment. 50 parts by weight of the epoxy resin having a glycidylamine part which was derived from met-axylylenediamine (TETRAD-X, manufactured by Mitsubishi Gas Chemical Co., Ltd.), 33 parts by weight of the epoxy resin curing agent A and 0.02 part by weight of the acrylic wetting agent (BYK348, manufactured by BYK Chemie GmbH.) were mixed, and the mixture was stirred well. This epoxy resin composition was coated on the surface of the steel plate by means of a bar coater so that a film thickness of about 90 μm was obtained, and it was cured at 120° C. for 30 minutes to form a coating film. The coating layer had an oxygen permeability coefficient of 0.25 ml-mm/m$^2$·day·MPa at a temperature of 23° C. and a relative humidity of 60%.

Example 5

A composition was prepared by the same method as in Example 4, except that 45 parts by weight of the epoxy resin curing agent B was substituted for the epoxy resin curing agent A. The coating layer had an oxygen permeability coefficient of 0.20 ml-mm/m$^2$·day·MPa at a temperature of 23° C. and a relative humidity of 60%.

Example 6

A composition was prepared by the same method as in Example 4, except that 35 parts by weight of the reaction product of metaxylylenediamine and methyl methacrylate having a mole ratio of 2:1 of metaxylylenediamine to methyl methacrylate (Gaskamine 340, manufactured by Mitsubishi Gas Chemical Co., Ltd.) was substituted for the epoxy resin curing agent A. The coating layer had an oxygen permeability coefficient of 0.40 ml-mm/m$^2$·day·MPa at a temperature of 23° C. and a relative humidity of 60%.

Comparative Example 5

A composition was prepared by the same method as in Example 4, except that 97 parts by weight of the epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine. The coating layer had an oxygen permeability coefficient of 4.2 ml-mm/m$^2$·day·MPa at a temperature of 23° C. and a relative humidity of 60%.

Comparative Example 6

A composition was prepared by the same method as in Example 4, except that 97 parts by weight of the epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine and that 33 parts by weight of the reaction product of metaxylylenediamine and epichlorohydrin having a mole ratio of 2:1 of metaxylylenediamine to epichlorohydrin (Gaskamine 328, manufactured by Mitsubishi Gas Chemical Co., Ltd.) was substituted for the epoxy resin curing agent A. The coating layer had an oxygen permeability coefficient of 8.4 ml-mm/m$^2$·day·MPa at a temperature of 23° C. and a relative humidity of 60%.

Comparative Example 7

A composition was prepared by the same method as in Example 4, except that 97 parts by weight of the epoxy resin having a glycidyl ether part which was derived from bisphenol A was substituted for the epoxy resin having a glycidylamine part which was derived from metaxylylene-diamine (Epikote 828, manufactured by Japan Epoxy Resin Co., Ltd.) and that 50 parts by weight of the modified heterocyclic amine (Epomate B002, manufactured by Japan Epoxy Resin Co., Ltd.) was substituted for the epoxy resin curing agent A. The coating layer had an oxygen permeability coefficient of 36 ml·mm/m²·day·MPa at a temperature of 23° C. and a relative humidity of 60%.

Comparative Example 8

A composition was prepared by the same method as in Example 4, except that 97 parts by weight of the epoxy resin having a glycidyl ether part which was derived from bisphenol A (Epikote 828, manufactured by Japan Epoxy Resin Co., Ltd.) was substituted for the epoxy resin having a glycidylamine part which was derived from metaxylylenediamine and that 25 parts by weight of the reaction product of metaxylylenediamine and methyl methacrylate having a mole ratio of 2:1 of metaxylylenediamine to methyl methacrylate (Gaskamine 340, manufactured by Mitsubishi Gas Chemical Co., Ltd.) and 11 parts by weight of the polyoxyalkyleneamine (Jefarmine T-403, manufactured by Hanzman Co., Ltd.) were substituted for the epoxy resin curing agent A. The coating layer had an oxygen permeability coefficient of 36 ml·mm/m²·day·MPa at a temperature of 23° C. and a relative humidity of 60% RH.

TABLE 3

(evaluation results of rust preventive performance of coated steel plate)

|  | Initial appearance | After 2 weeks | After 4 weeks | After 6 weeks |
|---|---|---|---|---|
| Example 4 | Ex | Ex | Ex | Ex |
| Example 5 | Ex | Ex | Ex | Ex |
| Example 6 | Ex | Ex | Ex | Ex |
| Comparative Example 5 | Ex | Ex | G | P |
| Comparative Example 6 | Ex | Ex | F | P |
| Comparative Example 7 | Ex | Ex | F | P |
| Comparative Example 8 | Ex | Ex | F | P |

C. Examples and Comparative Examples in Rust Preventive Method 2 for Metal

<Method for Evaluating a Rust Preventive Performance 2>

The coated steel plate which was scratched on the coated part on a diagonal line, was sprayed with saline water at 35° C., then measured a distance of rust progressing from the scratch.

Example 7

Added were 50 parts by weight of the epoxy resin having a glycidylamine part which was derived from metaxylylenediamine (TETRAD-X, manufactured by Mitsubishi Gas Chemical Co., Ltd.), 33 parts by weight of the epoxy resin curing agent A and 0.02 part by weight of the acrylic wetting agent (BYK348, manufactured by BYK Chemie GmbH.), and the mixture was stirred well. This was coated on the surface of a cold rolled steel plate (40×150×6.0 mm) by means of a bar coater so that a film thickness of about 40 μm was obtained, and it was cured at 120° C. for 30 minutes to form a coating film. The results thereof are shown in Table 4.

Example 8

A composition was prepared by the same method as in Example 7, except that 35 parts by weight of the reaction product of metaxylylenediamine and methyl methacrylate having a mole ratio of 2:1 of metaxylylenediamine to methyl methacrylate (Gaskamine 340, manufactured by Mitsubishi Gas Chemical Co., Ltd.) was substituted for the epoxy resin curing agent A. The results thereof are shown in Table 4.

Comparative Example 9

A composition was prepared by the same method as in Example 7, except that 50 parts by weight of the epoxy resin having a glycidyl ether part which was derived from bisphenol A (Epikote 828, manufactured by Japan Epoxy Resin Co., Ltd.), 13 parts by weight of the reaction product of metaxylylenediamine and epichlorohydrin having a mole ratio of 2:1 of metaxylylenediamine to epichlorohydrin (Gaskamine 328, manufactured by Mitsubishi Gas Chemical Co., Ltd.) and 6 parts by weight of the modified heterocyclic amine (Epomate B002, manufactured by Japan Epoxy Resin Co., Ltd.) were substituted for the epoxy resin having a glycidylamine part which was derived from metaxylylenediamine. The results thereof are shown in Table 4.

TABLE 4

(evaluation results of rust preventive performance 2 of coated steel plate)

|  | After 2 weeks | After 3 weeks | After 4 weeks | After 6 weeks |
|---|---|---|---|---|
| Example 7 | 0 | 0.1 | 0.2 | 0.3 |
| Example 8 | 0 | 0.1 | 0.1 | 0.2 |
| Comparative Example 9 | 0.3 | 0.7 | 0.7 | 3.7 |

What is claimed is:

1. An organic coated steel having an epoxy resin layer and a polymer resin layer laminated in order on the surface of a steel product, wherein said epoxy resin layer is formed by curing an epoxy resin composition comprising an epoxy resin and an epoxy resin curing agent as principal components and said epoxy resin layer has an oxygen permeability coefficient of 2 ml·mm/m²·day·MPa or less at a temperature of 23° C. and a relative humidity of 60% RH, wherein said epoxy resin layer comprises 30% by weight or more of a skeletal structure represented by the following Formula (1)

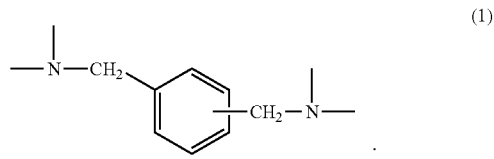

2. The organic coated steel as described in claim 1, wherein said epoxy resin layer has an oxygen permeability coefficient of 1 ml·mm/m²·day·MPa or less.

3. The organic coated steel as described in claim 1, wherein the epoxy resin described above comprises at least one selected from an epoxy resin having a glycidylamine part which is derived from metaxylylenediamine, an epoxy resin having a glycidylamine part which is derived from 1,3-bis(aminomethyl)cyclohexane, an epoxy resin having a glycidyl ether part which is derived from bisphenol F and an epoxy resin having a glycidyl ether part which is derived from resorcinol.

4. The organic coated steel as described in claim 3, wherein the epoxy resin described above comprises the epoxy resin having a glycidylamine part which is derived from metaxylylenediamine and/or the epoxy resin having a glycidyl ether part which is derived from bisphenol F as the principal components.

5. The organic coated steel as described in claim 4, wherein the epoxy resin described above comprises the epoxy resin having a glycidylamine part which is derived from metaxylylene-diamine as a principal component.

6. The organic coated steel as described in claim 1, wherein the epoxy resin curing agent described above is a reaction product of (A) and (B) or a reaction product of (A), (B) and (C) described below:
   (A) metaxylylenediamine or paraxylylenediamine,
   (B) a multifunctional compound having at least one acyl group which can form an amide group part by reacting with polyamine to form an oligomer, and
   (C) monovalent carboxylic acid having 1 to 8 carbon atoms and/or a derivative thereof.

7. The organic coated steel as described in claim 6, wherein the multifunctional compound (B) described above is acrylic acid, methacrylic acid and/or a derivative thereof.

8. The organic coated steel as described in claim 1, wherein the polymer resin layer described above is at least one layer selected from a polyolefin resin layer, a layer obtained by laminating a polyolefin resin layer on a modified polyolefin resin layer, a polyamide resin layer, a polyester resin layer, a polyacrylic resin layer, a polystyrene resin layer, a polycarbonate resin layer and a polyvinyl chloride resin layer.

9. The organic coated steel as described in claim 8, wherein the polymer resin layer described above is the layer obtained by laminating a polyolefin resin layer on a modified polyolefin resin layer.

10. An organic coated steel having an epoxy resin layer coated on the surface of a steel product, wherein said epoxy resin layer is formed by curing an epoxy resin composition comprising an epoxy resin and an epoxy resin curing agent as principal components and said epoxy resin layer has an oxygen permeability coefficient of 2 ml·mm/m²·day·MPa or less at a temperature of 23° C. and a relative humidity of 60% RH,
   wherein said epoxy resin layer includes 30% by weight or more of a skeletal structure represented by the following Formula (1)

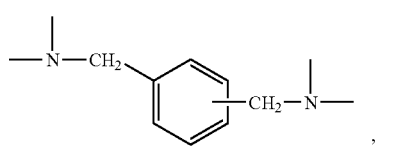

(1)

and said epoxy resin curing agent comprises a reaction product of (A) and (B) or a reaction product of (A), (B) and (C) described below:
   (A) a polyamine selected from the group consisting of aliphatic amines, aliphatic amines having aromatic ring, alicyclic amines and aromatic amines,
   (B) a multifunctional compound having at least one acyl group which can form an amide group part by reacting with the polyamine to form an oligomer, and
   (C) monovalent carboxylic acid having 1 to 8 carbon atoms and/or a derivative thereof.

11. The organic coated steel as described in claim 10, wherein said epoxy resin layer has an oxygen permeability coefficient of 1 ml·mm/m²·day·MPa or less.

12. The organic coated steel as described in claim 10, wherein the epoxy resin described above comprises at least one selected from an epoxy resin having a glycidylamine part which is derived from metaxylylenediamine, an epoxy resin having a glycidylamine part which is derived from 1,3-bis(aminomethyl)cyclohexane, an epoxy resin having a glycidyl ether part which is derived from bisphenol F and an epoxy resin having a glycidyl ether part which is derived from resorcinol.

13. The organic coated steel as described in claim 12, wherein the epoxy resin described above comprises the epoxy resin having a glycidylamine part which is derived from metaxylylenediamine and/or the epoxy resin having a glycidyl ether part which is derived from bisphenol F as the principal components.

14. The organic coated steel as described in claim 13, wherein the epoxy resin described above comprises the epoxy resin having a glycidylamine part which is derived from metaxylylenediamine as a principal component.

15. The organic coated steel as described in claim 10, wherein the polyamine is metaxylylenediamine or paraxylylenediamine.

16. The organic coated steel as described in claim 10, wherein the multifunctional compound (B) described above in acrylic acid, methacrylic acid and/or a derivative thereof.

17. The organic coated steel as described in claim 10, wherein a polymer resin layer is further laminated on the epoxy resin layer.

18. A rust preventing method for metal in which a coating layer is formed on the surface of metal, wherein said coating layer is formed by curing an epoxy resin composition comprising an epoxy resin and an epoxy resin curing agent as principal components, and said coating layer has an oxygen permeability coefficient of 2 ml·mm/m²·day·MPa or less at a temperature of 23° C. and a relative humidity of 60% RH,
   wherein said coating layer includes 30% by weight or more of a skeletal structure represented by the following Formula (1)

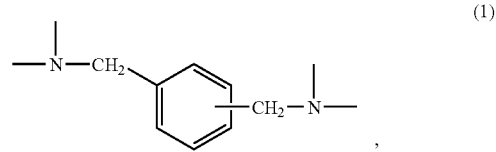

(1)

and said epoxy resin curing agent comprises a reaction product of (A) and (B) or a reaction product of (A), (B) and (C) described below:
   (A) a polyamine selected from the group consisting of aliphatic amines, aliphatic amines having aromatic ring, alicyclic amines and aromatic amines,
   (B) a multifunctional compound having at least one acyl group which can form an amide group part by reacting with the polyamine to form an oligomer, and
   (C) monovalent carboxylic acid having 1 to 8 carbon atoms and/or a derivative thereof.

19. The rust preventing method for metal as described in claim 18, wherein the coating layer has an oxygen permeability coefficient of 1 ml·mm/m$^2$·day·MPa or less.

20. The rust preventing method for metal as described in claim 18, wherein the epoxy resin described above comprises at least one selected from an epoxy resin having a glycidylamine part which is derived from metaxylylenediamine, an epoxy resin having a glycidylamine part which is derived from 1,3-bis(aminomethyl)cyclohexane, an epoxy resin having a glycidyl ether part which is derived from bisphenol F and an epoxy resin having a glycidyl ether part which is derived from resorcinol.

21. The rust preventing method for metal as described in claim 20, wherein the epoxy resin described above comprises the epoxy resin having a glycidylamine part which is derived from metaxylylenediamine and/or the epoxy resin having a glycidyl ether part which is derived from bisphenol F as the principal components.

22. The rust preventing method for metal as described in claim 21, wherein the epoxy resin described above comprises the epoxy resin having a glycidylamine part which is derived from metaxylylenediamine as a principal component.

23. The rust preventing method for metal as described in claim 18, wherein the polyamine is metaxylylenediamine or paraxylylenediamine.

24. The rust preventing method for metal as described in claim 18, wherein the multifunctional compound (B) described above is acrylic acid, methacrylic acid and/or a derivative thereof.

* * * * *